(12) United States Patent
Raghavan et al.

(10) Patent No.: US 7,840,700 B2
(45) Date of Patent: Nov. 23, 2010

(54) DYNAMICALLY ADDING APPLICATION LOGIC AND PROTOCOL ADAPTERS TO A PROGRAMMABLE NETWORK ELEMENT

(75) Inventors: Kollivakkam Raghavan, San Jose, CA (US); Pravin Singhal, Cupertino, CA (US); Sunil Potti, Castro Valley, CA (US); Tefcros Anthias, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 667 days.

(21) Appl. No.: 11/473,194

(22) Filed: Jun. 21, 2006

(65) Prior Publication Data

US 2007/0011332 A1    Jan. 11, 2007

Related U.S. Application Data

(60) Provisional application No. 60/692,715, filed on Jun. 21, 2005.

(51) Int. Cl.
*G06F 15/173* (2006.01)
(52) U.S. Cl. .................................... 709/238
(58) Field of Classification Search ............... 709/238
See application file for complete search history.

(56) References Cited

U.S. PATENT DOCUMENTS

| 5,796,743 | A | 8/1998 | Bunting et al. |
| 6,611,526 | B1 | 8/2003 | Chinnaswamy et al. |
| 6,772,211 | B2 * | 8/2004 | Lu et al. ............. 709/226 |
| 7,321,556 | B1 | 1/2008 | Parekh et al. |
| 7,415,512 | B1 | 8/2008 | Moon |

(Continued)

FOREIGN PATENT DOCUMENTS

WO    WO 03/021465 A1    3/2003

OTHER PUBLICATIONS

International Searching Authority, "Notification of Transmittal of the International Search Report and the Written Opinion of the International Searching Authority, or the Declaration", International application No. PCT/US05/46149, dated Jul. 20, 2007, 9 pages.

(Continued)

*Primary Examiner*—Hassan Phillips
*Assistant Examiner*—Ebrahim Golabbakhsh
(74) *Attorney, Agent, or Firm*—Hickman Palermo Truong & Becker LLP

(57) ABSTRACT

Custom or user-defined application program extensions may be loaded into a network infrastructure element such as a router or switch without restarting the device. For example, a network element has program extensibility logic operable for receiving one or more user program extensions that comprise logic operable to interface with the application program and perform message processing functions or protocol processing functions that are not in the application program; installing the one or more user program extensions without restarting the apparatus; receiving one or more packets representing an application message; selecting a particular one of the user program extensions based on a protocol associated with the message; loading the particular one of the user program extensions; executing business logic of the application program associated with the received message; and invoking a function of the particular one of the user program extensions in response to a call in the business logic.

24 Claims, 8 Drawing Sheets

U.S. PATENT DOCUMENTS

| | | | |
|---|---|---|---|
| 7,421,695 B2 | 9/2008 | Murray et al. | |
| 2001/0047422 A1 | 11/2001 | McTernan et al. | |
| 2002/0069279 A1 | 6/2002 | Romero et al. | |
| 2002/0105911 A1 | 8/2002 | Pruthi et al. | |
| 2002/0107951 A1* | 8/2002 | Teague et al. | 709/223 |
| 2002/0114274 A1* | 8/2002 | Sturges et al. | 370/229 |
| 2002/0143981 A1* | 10/2002 | DeLima et al. | 709/233 |
| 2002/0163933 A1* | 11/2002 | Benveniste | 370/465 |
| 2002/0191622 A1* | 12/2002 | Zdan | 370/401 |
| 2002/0194342 A1 | 12/2002 | Lu et al. | |
| 2003/0004672 A1* | 1/2003 | Thurman | 702/123 |
| 2003/0005117 A1* | 1/2003 | Kang et al. | 709/225 |
| 2003/0009571 A1 | 1/2003 | Bavadekar | |
| 2003/0036897 A1* | 2/2003 | Flores et al. | 703/22 |
| 2003/0046429 A1 | 3/2003 | Sonksen | |
| 2003/0078031 A1 | 4/2003 | Masuda | |
| 2003/0112809 A1* | 6/2003 | Bharali et al. | 370/400 |
| 2003/0177183 A1 | 9/2003 | Cabrera et al. | |
| 2003/0182419 A1* | 9/2003 | Barr et al. | 709/224 |
| 2003/0202535 A1 | 10/2003 | Foster et al. | |
| 2003/0217171 A1* | 11/2003 | Von Stuermer et al. | 709/231 |
| 2004/0039940 A1* | 2/2004 | Cox et al. | 713/201 |
| 2004/0088460 A1 | 5/2004 | Poisner | |
| 2004/0128360 A1* | 7/2004 | Petri et al. | 709/214 |
| 2004/0162871 A1* | 8/2004 | Pabla et al. | 709/201 |
| 2004/0205336 A1* | 10/2004 | Kessler et al. | 713/160 |
| 2004/0260760 A1 | 12/2004 | Curnyn | |
| 2004/0267920 A1 | 12/2004 | Hydrie et al. | |
| 2004/0267933 A1* | 12/2004 | Przybylski et al. | 709/227 |
| 2005/0005031 A1 | 1/2005 | Gordy et al. | |
| 2005/0025091 A1 | 2/2005 | Patel et al. | |
| 2005/0102393 A1 | 5/2005 | Murray et al. | |
| 2005/0148314 A1 | 7/2005 | Taglienti et al. | |
| 2005/0213591 A1* | 9/2005 | Nakazawa et al. | 370/401 |
| 2005/0228893 A1 | 10/2005 | Devarapalli et al. | |
| 2005/0252970 A1 | 11/2005 | Howarth et al. | |
| 2005/0286461 A1 | 12/2005 | Zhang et al. | |
| 2005/0289538 A1* | 12/2005 | Black-Ziegelbein et al. | 717/177 |
| 2006/0015699 A1 | 1/2006 | Fujiwara et al. | |
| 2006/0123226 A1 | 6/2006 | Kumar et al. | |
| 2006/0129689 A1 | 6/2006 | Ho et al. | |
| 2006/0155862 A1* | 7/2006 | Kathi et al. | 709/229 |
| 2006/0155969 A1 | 7/2006 | Yoda et al. | |
| 2006/0236062 A1 | 10/2006 | Boss et al. | |
| 2006/0256768 A1 | 11/2006 | Chan | |
| 2007/0011223 A1* | 1/2007 | Calvignac et al. | 709/200 |
| 2007/0055864 A1 | 3/2007 | Tock et al. | |
| 2008/0209413 A1* | 8/2008 | Kakumani et al. | 717/172 |

OTHER PUBLICATIONS

Claims, International application No. PCT/US05/46149, 10 pages.
International Searching Authority, "Notification of Transmittal of the International Search Report and the Written Opinion of the International Searching Authority, or the Declaration," PCT/US2006/024375, dated Oct. 17, 2006, 10 pages.
Current Claims, PCT/US2006/024375, 6 pages.

* cited by examiner

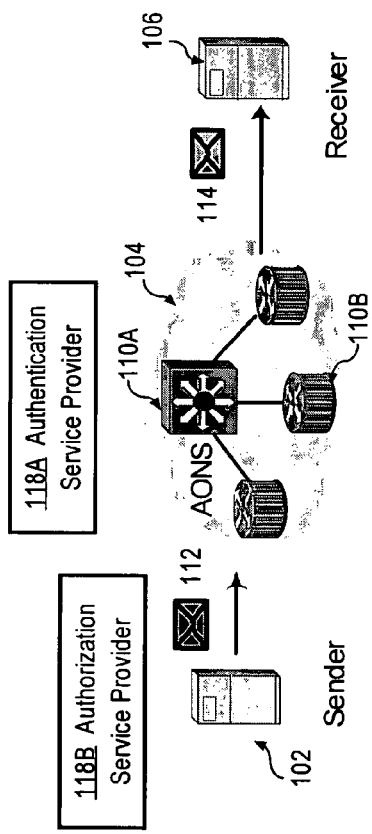
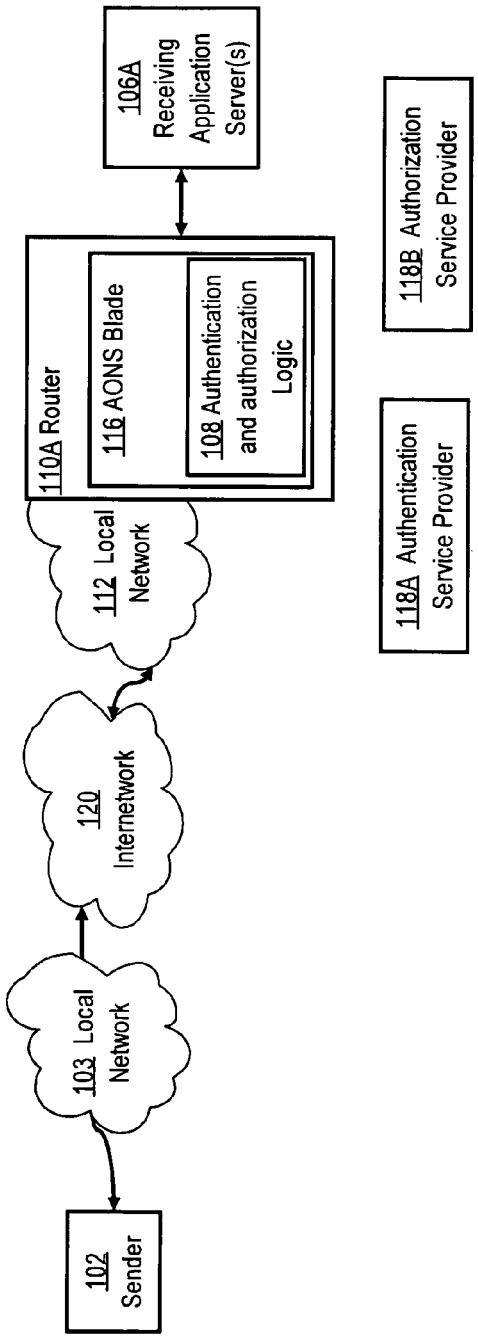

DYNAMICALLY ADDING APPLICATION LOGIC AND PROTOCOL ADAPTERS TO A PROGRAMMABLE NETWORK ELEMENT

PRIORITY CLAIM

This application claims the benefit under 35 U.S.C. 119(e) of provisional Application No. 60/692,715, filed Jun. 21, 2005, the entire contents of which are hereby incorporated by reference for all purposes as if fully set forth herein.

CROSS-REFERENCE TO RELATED APPLICATIONS

This application is related to U.S. patent application Ser. No. 11/043,857, filed Jan. 25, 2005, entitled "APPLICATION LAYER MESSAGE-BASED SERVER FAILOVER MANAGEMENT BY A NETWORK ELEMENT," by Sunil Potti et al.; U.S. patent application Ser. No. 10/991,792, entitled "PERFORMING MESSAGE AND TRANSFORMATION ADAPTER FUNCTIONS IN A NETWORK ELEMENT ON BEHALF OF AN APPLICATION", by Pravin Singhal et al., filed on Nov. 17, 2004; U.S. patent application Ser. No. 10/997,616, entitled "CACHING CONTENT AND STATE DATA AT A NETWORK ELEMENT", by Alex Yiu-Man Chan et al., filed on Nov. 23, 2004; U.S. patent application Ser. No. 11/005,978, entitled "PERFORMING MESSAGE PAYLOAD PROCESSING FUNCTIONS IN A NETWORK ELEMENT ON BEHALF OF AN APPLICATION", by Tefcros Anthias et al., filed on Dec. 6, 2004; U.S. patent application Ser. No. 11/007,421, entitled "PERFORMING SECURITY FUNCTIONS ON A MESSAGE PAYLOAD IN A NETWORK ELEMENT", by Sandeep Kumar et al., filed on Dec. 7, 2004; U.S. patent application Ser. No. 11/007,152, entitled "NETWORK AND APPLICATION ATTACK PROTECTION BASED ON APPLICATION LAYER MESSAGE INSPECTION", by Sandeep Kumar et al., filed on Dec. 7, 2004; U.S. patent application Ser. No. 11/009,127, entitled "REDUCING THE SIZES OF APPLICATION LAYER MESSAGES IN A NETWORK ELEMENT", by Ricky Ho et al., filed on Dec. 10, 2004; U.S. patent application Ser. No. 11/009,270, entitled "GUARANTEED DELIVERY OF APPLICATION LAYER MESSAGES BY A NETWORK ELEMENT", by Tefcros Anthias et al., filed on Dec. 10, 2004; U.S. patent application Ser. No. 11/031,106, filed Jan. 5, 2005, entitled "INTERPRETING AN APPLICATION MESSAGE AT A NETWORK ELEMENT USING SAMPLING AND HEURISTICS," by Tefcros Anthias et al., filed on Jan. 5, 2005, and U.S. patent application Ser. No. 11/031,184, filed on Jan. 6, 2005, entitled "DATA TRAFFIC LOAD BALANCING BASED ON APPLICATION LAYER MESSAGES," by Hari Kathi et al., filed on Jan. 6, 2005, the entire contents of which are hereby incorporated by reference for all purposes as if fully set forth herein.

FIELD OF THE INVENTION

The present invention generally relates to data processing techniques performed within network infrastructure elements such as routers and switches. The invention relates more specifically to techniques for customizing the parsing of transport protocols on which messages are received and performing custom message processing functions on an application message in a network infrastructure element.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior aft by inclusion in this section.

Software applications operating in a network environment exchange application messages. An "application message," or simply "message", as used herein, refers to a message emitted or consumed by a software element that is logically located at Layer 5 or higher of the OSI reference model. Messages may be contained in more than one data frame, packet or segment. For simplicity, the term "packet" is used to refer to a unit of organization under an internetworking protocol, such as data frame, packet or segment, at Layer 2, 3 or 4 of the OSI reference model.

Application end points such as clients and servers in a distributed system communicate over a network using many different transport layer protocols such as HTTP, JMS, SMTP, FTP, etc. Independent of the transport layer protocols, messages themselves can have their own formats such as XML, TEXT, BINARY, etc. In addition to standard formats, applications sometimes use their own proprietary message formats as well as proprietary transport protocols that are best suited for their requirements.

Additionally, as applications need to interact with other networked applications which use their own proprietary or standard transport protocols and message formats, the messages that travel from one application to another may need different custom processing for both transport level protocols and custom business logic.

Application message formats are not static and may change to support business needs. The business logic code that processes these application messages must change to support the new message formats. On the other hand, the same application message may be transmitted using different protocols to support business needs. Custom protocol handlers may need to handle the processing of these messages over the new transport protocol.

Generally, in past approaches, in order to handle any of these changes, the implementation of the application has to be changed, the application has to be reloaded into the network device, and the network device has to be restarted. This is time-consuming, requires significant resources in programming labor, and is disruptive to network operations. Further, in typical past approaches, the number of servers on which the applications run is much higher than the number of network elements that interconnect them. The custom business logic for handling different message formats and transport protocols must be provisioned and managed on all the servers, which is time-consuming and labor-intensive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram that illustrates an overview of a network arrangement that can be used to implement an embodiment;

FIG. 1B is a block diagram showing authentication and authorization logic in a network infrastructure element such as a router, in one embodiment;

DETAILED DESCRIPTION

Figure 2:
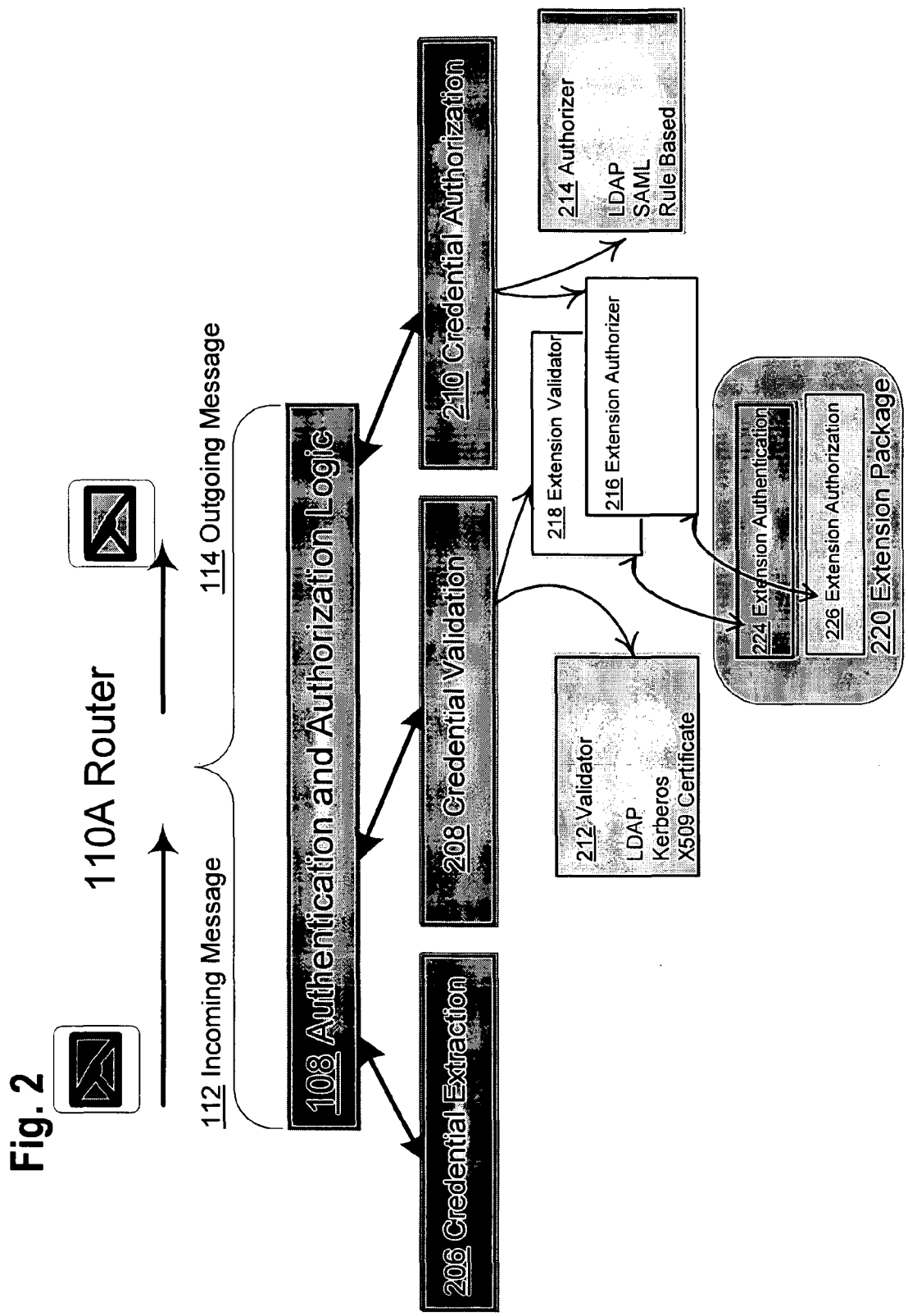
FIG. 2 is a block diagram of software elements that may be used to implement the authentication and authorization logic, in one embodiment.

Dynamically adding application logic and protocol adapters to a programmable network element is described. Approaches herein may allow for customizing the parsing of transport protocols on which messages are received and also custom message processing functions on an application message in a network infrastructure device. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Description
3.0 AONS Implementation Examples
   3.1 AONS General Overview
   3.2 Multi-Blade Architecture
   3.3 AONS Blade Message Processing Framework
   3.4 Extension Package Implementation
4.0 Implementation Mechanisms—Hardware Overview
5.0 Extensions and Alternatives
1.0 General Overview In an embodiment, custom or user-defined application program extensions may be loaded into a network infrastructure element such as a router or switch without restarting the device. For example, a network element has program extensibility logic operable for receiving one or more user program extensions that comprise logic operable to interface with the application program and perform message processing functions or protocol processing functions that are not in the application program; installing the one or more user program extensions without restarting the apparatus; receiving one or more packets representing an application message; selecting a particular one of the user program extensions based on a protocol associated with the message; loading the particular one of the user program extensions; executing business logic of the application program associated with the received message; and invoking a function of the particular one of the user program extensions in response to a call in the business logic.

According to one aspect, the invention provides a data processing apparatus, comprising a plurality of network interfaces that are coupled to a data network for receiving one or more packets therefrom and sending one or more packets thereto; one or more processors; a switching system coupled to the one or more processors and packet forwarding logic, wherein the switching system and packet forwarding logic are configured to receive packets on a first network interface, determine a second network interface on which to send the packets, and to send the packets on the second network interface; a computer-readable storage medium having an application program stored thereon; program extensibility logic which when executed by the one or more processors is operable to cause: receiving one or more user program extensions, wherein the user program extensions comprise logic operable to interface with the application program and perform any of message processing functions and protocol processing functions that are not in the application program; installing the one or more user program extensions without restarting the apparatus; receiving one or more packets representing an application message; selecting a particular one of the user program extensions based on a protocol associated with the message; loading the particular one of the user program extensions; executing business logic of the application program associated with the received message; invoking a function of the particular one of the user program extensions in response to a call in the business logic.

In one feature, the application message comprises one or more transport protocol headers, and the program extensibility logic comprises logic which when executed by the one or more processors is operable to select and invoke the particular one of the user program extensions based on values located in the one or more transport protocol headers.

In another feature, the application message comprises one or more application message headers, and the program extensibility logic comprises logic which when executed by the one or more processors is operable to select and invoke the particular one of the user program extensions based on values located in the application message headers.

In a further feature, the one or more user program extensions comprise one or more extension functions, and the program extensibility logic comprises logic which when executed by the one or more processors is operable to select and invoke a particular extension function from among the plurality of extension functions based upon values in the application message.

In still another feature, the one or more user program extensions comprise one or more protocol handling functions, and the program extensibility logic comprises logic which when executed by the one or more processors is operable to select and invoke one of the protocol handling functions from among the plurality of protocol handling functions based upon values in the application message.

In yet another feature, the apparatus comprises any of a packet data router and a packet data switch in a packet-switched network.

In a further feature, the program extensibility logic comprises logic which when executed by the one or more processors is operable to: identify in the application message any of a transport protocol and an application protocol; select a particular user-defined custom protocol handler, from among a plurality of stored user-defined protocol handlers, based upon the identified transport protocol; use the particular user-defined custom protocol handler to transform the application message into a modified outbound application message.

In yet another feature, the program extensibility logic comprises logic which when executed by the one or more processors is operable to: identify a custom user function based on values in any of the transport protocol of the message, application protocol of the message, and message body; load and invoke the user defined extension function based on the identified custom user function.

In other aspects, the invention encompasses a machine-implemented method and a computer-readable medium configured to carry out the foregoing steps.

2.0 Structural and Functional Overview

FIG. 1A is a block diagram of network elements involved in an extensible authentication approach according to an embodiment. FIG. 1B is a block diagram showing authentication and authorization logic in a network infrastructure element such as a router, in one embodiment.

Referring first to FIG. 1A, a sender 102 is coupled through a network 104 to a receiver 106. The network 104 comprises one or more network infrastructure elements 110, such as routers or switches. Each of the network elements 110 comprises one or more blades, bladelets, or other software elements, alone or in combination with hardware or firmware elements, that implement inspection, at various OSI layers, of packets received in association with an application message and related authentication and authorization functions as described herein.

A commercial embodiment of network elements 110A may comprise routers or switches from Cisco Systems, Inc., San Jose, Calif., with blades having Application-Oriented Networking Services (AONS) capabilities. In some embodiments, network elements 110A are termed "AONS nodes" or "AONS endpoints." Other network elements 110B may be non-AONS nodes. Further, network elements 110A need not use Cisco AONS technology; the network elements can comprise routers or switches that comprise other internal elements to perform extensible authentication and authorization functions as described herein. Thus, the use of AONS in an embodiment is not required, and all references herein to AONS elements are provided merely to illustrate a clear example, and not as limitations.

In an embodiment, the validation of an application message by network elements 110A involves accessing an authentication service provider 118A and an authorization service provider 118B.

The authentication service provider 118A may implement either standard-based or proprietary technology-based authentication services. Similarly, the authorization service 118B may implement either standard-based or proprietary technology-based authorization services. Examples of the standard-based authentication or authorization service providers include those based on LDAP, Kerberos, X509, or SAML. In some embodiments, authentication or authorization service providers such as 118A or 118B may comprise database access routines and a database storing user credential and privilege information. Furthermore, in some embodiments, an authentication service provider and an authorization service provider can comprise a single authentication and authorization server.

As seen in FIG. 1B, sender 102 is coupled through a local network 103 to an internetwork 120 that is coupled to another local network 112. Either of the local networks 103 and 112 may have network elements 110 that implement the techniques herein. As an example, router 110A in local network 112 is equipped with an AONS blade 116, available from Cisco Systems, Inc. San Jose, Calif. The AONS blade 116 comprises one or more bladelets that form authentication and authorization logic 108. In certain embodiments all the network elements 110 include authentication and authorization logic 108, which comprises one or more computer programs, programmatic objects, or other software elements that implement the functions described herein.

Generally, the authentication and authorization logic 108 identifies user credentials in an application message. Examples of user credentials are peer SSL certificates, HTTP basic authentication scheme and parameters, or HTTP negotiate authentication data from message headers, and user/password token, SAML token, SPNEGO token or X509 token from a message body.

The authentication and authorization logic 108 performs authentication and authorization based on the user credentials that were identified. If the authentication and authorization of the application message succeeds, the application message is processed according to a policy. For example, the message is forwarded to a receiving application server 106A. Thus, in the arrangement of FIG. 1B, router 110 is proximate to the receiving application servers 106A, and can perform authentication and authorization for all the application servers. For example, sender 102, and other senders at different locations in networks 103, 120, might send different requests to different instances of applications on different application servers 106A. The authentication and authorization logic 108 can perform application message authentication and authorization for all such requests, relieving the application instances and application servers 106A from the processing burden of authentication and authorization for each request.

Alternatively, if router 110 is located in local network 103, the router can perform application message authentication and authorization when sender 102 emits messages and before the messages reach the application servers 106A. In all such cases, the data processing efficiency of the application servers 106A is greatly improved because router 110 is responsible for message authentication and authorization, and the application servers are responsible only for performing substantive application functions.

When an application message authentication and authorization operation is performed in a network device, the operation can be performed on a device that is closer to the application that is sending the message or the application that is receiving the message. As a result, if there are multiple instances of an application running, possibly on different hosts, then a single device through which all the messages are passing can perform the needed authentication and authorization. Accordingly, efficiency of the overall network is improved.

In some embodiments, extensible authentication and authorization is provided by using a user configurable policy. In this approach, the user configurable policy specifies how an incoming message should be authenticated or authorized.

In one embodiment, through a user interface, a user is enabled in the user configurable policy to define a plurality of message types and associations each of which associates between a particular authentication method with a corresponding message type. In one embodiment, the policy is created at design time in advance of message processing, based on known characteristics of incoming messages and outgoing messages. The policy associates authentication methods or authorization methods with respective message types. The policy can also associate user credential location definitions that specify locations of user credentials with respective message types. For example, the policy can be created using AONS Design Studio (ADS), and downloaded to an AONS node via AONS Management Console (AMC). An ADS designer can select an authentication method for a message type among LDAP and Kerberos SPNEGO, X509 Certificate based authentication methods and extension authentication methods provided by extension packages, as further explained herein. Similarly, the ADS designer can select an authorization method for the message type among LDAP Group-, SAML Assertion-, and Rule-based methods and extension authorization methods provided by extension packages. During runtime, the authentication and authorization logic 108 retrieves the policy and an incoming message. The authentication and authorization logic 108 determines the application message type, identifies user credentials in the message, validates the incoming message by applying associated authentication and authorization methods, and, if successful, directs other elements of the network element 110A to process the message according to a success policy, e.g., to forward the message on a path to a receiving application server 106A.

FIG. 2 is a block diagram of software elements that can be used to implement the authentication and authorization logic 108 in an AONS blade 116 of a router, in one embodiment. The authentication and authorization logic 108 comprises logic for credential extraction 206, credential validation 208, and credential authorization 210. In one embodiment, the logic can take the form of one or more AONS bladelets. For example, credential extraction 206, credential validation 208, and credential authorization 210 can be implemented as "identify", "authenticate", and "authorize" bladelets, respectively.

Upon receiving an incoming message 112 on any network interface of the router, the credential extraction 206 inspects the message. Credential extraction 206 has access to user credential location definitions for various application message types. In a preferred embodiment, credential extraction 206 makes use of existing components in the network infrastructure element 110A that allow extraction or identification in packets associated with an application message of fields in various OSI layers. The search of user credential fields may be conducted on headers, data, or payloads at standard locations or non-standard locations, and additionally or alternatively, using name-value pairs or regular expressions. In one embodiment, credential extraction 206 identifies user credentials or a subset thereof in locations specified by standards. In another embodiment, the credential extraction identifies the user credentials or a subset thereof based on user credential location definitions for the message type. In yet another embodiment, credential extraction 206 identifies the user credentials from both locations identified by the standards and by the user credential location definitions.

Credential validation 208 authenticates an identity associated with the user credentials. In a preferred embodiment, credential validation 208 comprises a validator 212 for built-in authentication methods and an extension validator 218 for non built-in authentication methods, which may be developed before or after the network infrastructure element 110A is deployed. For the built-in authentication methods, a user or policy specifies which one is to be used for a particular application message type. For example, the authenticate bladelet embodiment of credential validation 208 in an AONS bladelet has built-in authentication methods based on LDAP, Kerberos SPNEGO or X509 Certificate.

The extension validator 218 can be configured to invoke an extension authentication 224 in extension packages 220 for authentication methods that do not have built-in support. The extension packages 220 for non built-in authentication methods may be deployed before or after the installation of the router 110A in a network. In a preferred embodiment, the authentication and authorization logic 108 does not require the presence of a particular extension package 220 unless a corresponding non built-in authentication method is to be supported. However, when a non built-in authentication method is to be supported at runtime, the extension validator 218 is configured accordingly and the extension authentication 224 is provisioned to the network infrastructure element 110A.

An extension authentication 224 can be developed in a programming language that makes use of application programming interfaces (APIs) to support a particular authentication method. For example, an extension authentication can be developed in JAVA that makes use of SiteMinder JAVA Agent APIs, available from Computer Associates, Inc. ("CA"), to support the SiteMinder Authentication. In a preferred embodiment, the configuration that directs the extension validator 218 to use the extension authentication thus developed can be specified in AONS Design Studio. Both the configuration and the extension authentication can be provisioned to the network infrastructure element 110A to form an extension package 220 before its use by the extension validator 218 at runtime. In a preferred embodiment, the configuration and the extension package can be pre-packaged into a downloadable file in AONS Design Studio, and subsequently downloaded to an AONS node.

When the extension authentication 224 is invoked, it is made available all the required and optional parameters by the authentication and authorization logic 108. The extension authentication 224 reads configuration parameters relevant to accessing an authentication service provider or a database that stores necessary information for authentication. In some embodiments, the parameter list, values, and access routines for parameters are configured for a particular authentication method and authentication service provider in authentication and authorization logic 108. In a preferred embodiment, the parameter list, values, and access routines for parameters can be pre-packaged into a downloadable file in AONS Design Studio, and subsequently downloaded to an AONS node. For example, as a part of extension configuration in AMC, a user configures necessary and optional parameters including those required for connecting to an authentication service provider such as SiteMinder Policy Server from CA.

At runtime, the extension authentication 224 uses the parameters, performs the authentication method, and returns the result to its caller.

The credential authorization 210 can be invoked to authorize privileges to an identity associated with the user credentials. In a preferred embodiment, the credential authorization 210 comprises an authorizer 214 for built-in authorization methods and an extension authorizer 216 for non built-in authorization methods, which may be developed later. For the built-in authentication methods, a user or policy specifies which one is to be used for a particular application message type. For example, the authorize bladelet embodiment of credential authorization 210 in an AONS bladelet has built-in authorization methods based on LDAP Groups, SAML Assertions or rules.

The extension authorizer 216 can be configured to invoke an extension authorization 226 in extension packages 220 for authorization methods that do not have built-in support. The extension packages 220 for non built-in authorization methods may be deployed before or after the installation of the router 110A in a network. In a preferred embodiment, the authentication and authorization logic 108 does not require a particular extension package 220 unless a corresponding non built-in authorization method is to be supported. However, when a non built-in authorization method is to be supported at runtime, the extension authorizer 216 is configured accordingly and the extension authorization 226 is transferred to the network infrastructure element 110A.

An extension authorization 226 can be developed in a programming language that makes use of application programming interfaces (hereinafter APIs) to support a particular authorization method. For example, an extension authorization can be developed in JAVA that makes use of SiteMinder JAVA Agent APIs to support SiteMinder Authorization. In a preferred embodiment, the configuration that directs the extension authorizer 216 to use the extension authorization thus developed can be specified in AONS Design Studio. Both the configuration and the extension authorization can be provisioned to the network infrastructure element 110A to form an extension package 220 before its use by the extension authorizer 216 at runtime. In a preferred embodiment, the configuration and the extension package can be pre-packaged into a downloadable file in AONS Design Studio, and subsequently downloaded to an AONS node.

When the extension authorization 226 is invoked, it is made available all the required and optional parameters by the authentication and authorization logic 108. The extension authorization 226 reads configuration parameters relevant to accessing an authorization service provider or a database that stores necessary information for authorization. In some embodiments, the parameter list, values, and access routines for parameters are configured for a particular authorization method and authorization service provider in authentication and authorization logic 108. In a preferred embodiment, the parameter list, values, and access routines for parameters can be pre-packaged into a downloadable file in AONS Design Studio, and subsequently downloaded to an AONS node. For example, as a part of extension configuration in AMC, a user configures necessary and optional parameters including those required for connecting to an authorization service provider such as SiteMinder Policy Server from CA.

At runtime, the extension authorization 226 uses the parameters, performs the authorization method, and returns the result.

If the authentication and authorization tasks complete successfully, the authentication and authorization logic 108 directs the application message to a receiving application server 106A.

Thus, the extension validator 218, extension authorizer 216, extension package 220, which may include extension authentication 224 or extension authorization 226, represent an extensibility mechanism for the authentication and authorization logic 108.

There may be multiple extension packages 220 deployed in a network infrastructure element 110A. In various embodiments, an extension package 220 may provide support for authentication only, or for authorization only, or both. Thus, the SiteMinder extension package, discussed above, which supports both authentication and authorization, is described solely to present a clear example and not as a limitation. Furthermore, an extension package 220 may provide support for authentication and/or authorization using service providers other than SiteMinder as discussed. In one embodiment, authentication and/or authorization service is provided by Tivoli Access Manager from International Business Machine Corp., Armonk, N.Y. Thus, network elements 110A need not depend on a particular authentication and/or authorization service provider such as SiteMinder. Any authentication and/or authorization provider that is capable of performing authentication and authorization service upon a request by an extension package described herein is within the scope of the present invention. Thus, the use of SiteMinder in an embodiment is not required, and all references herein to SiteMinder are provided merely to illustrate a clear example, and not as limitations.

In an embodiment, support for a new authentication or authorization method by the network infrastructure element 110A can be disabled or enabled without requiring changes in implementation or re-building of the network infrastructure element code. In this embodiment, a user can easily enable or disable a method for business reasons, such as a change in a business partner relationship involving an authentication or authorization service provider. Also, a supplier for network infrastructure element 110A may need to enable or disable support for a specific method based on a licensing agreement or possibly different product bundling needs.

Figure 3:
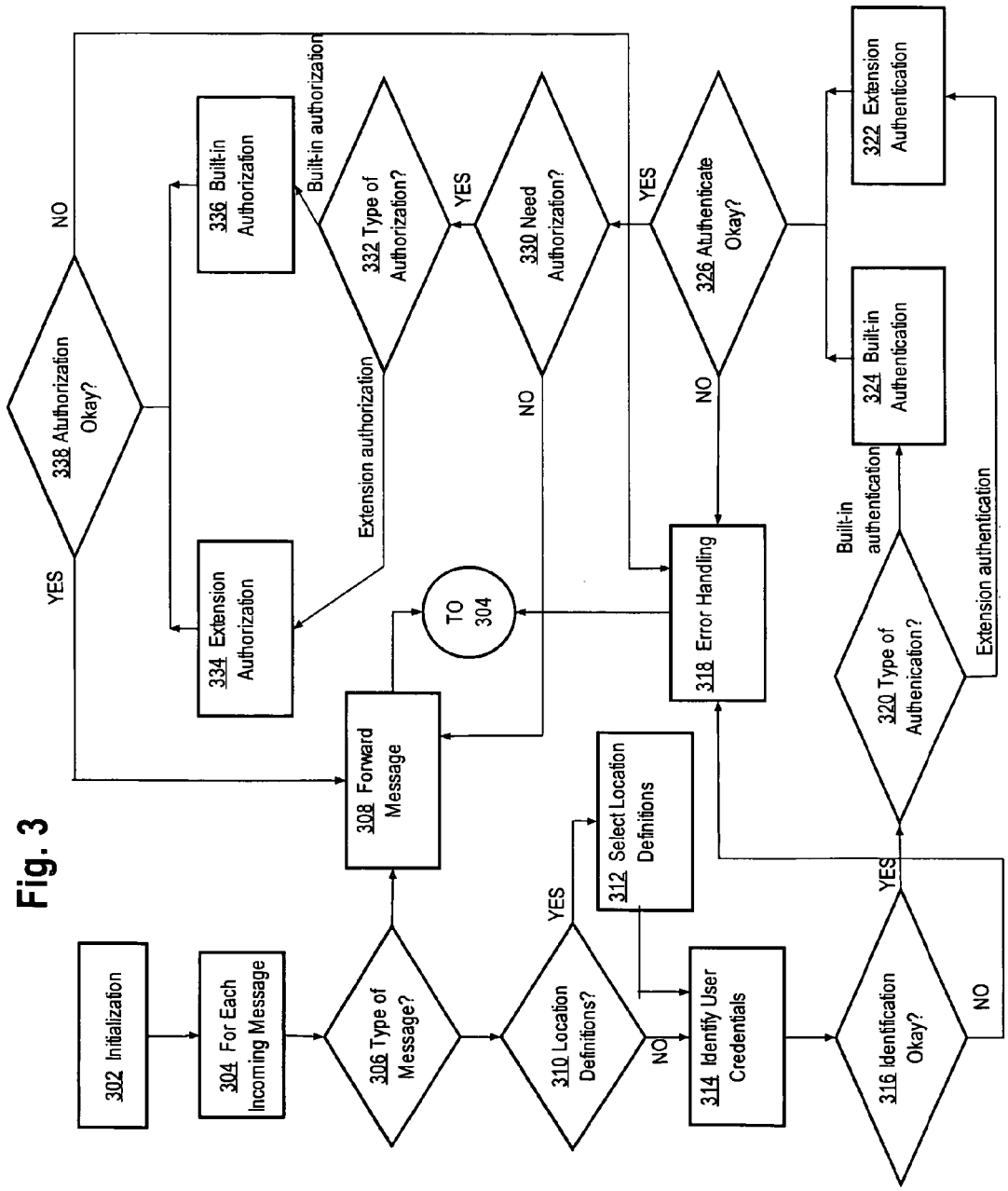
FIG. 3 is a flow diagram of one embodiment of a process of application message authentication and authorization.

FIG. 3 is a flow diagram of one embodiment of a process of application message authentication and authorization. In step 302, initialization is performed, for example, by the authentication and authorization logic 108. In one embodiment, initialization comprises reading configuration parameters, including a message type list, authentication method list, authorization method list, user credentials location definitions, and associations between a message type and its respective authentication and authorization methods and user credential location definitions.

At step 304, for each incoming message received from a data network coupled to the network infrastructure element 110A, certain other steps are performed. In step 306, the type of the application message is determined by the network infrastructure element 110A. The type of an application message may be determined on a number of attributes carried by the application message or the underlying packets associated with the application message. Attributes capable of identifying application message types include endpoints' addresses or ports, universal resource locations (URL) at HTTP level, special fields in the message, or regular expression patterns. Additionally or alternatively, attributes capable of identifying application include any standard or proprietary tokens embedded in a message or underlying packet that identifies a particular type for an application message. For example, a string constant denoting an application name may be embedded in an application message in a proprietary manner to identify a particular application type.

If the incoming message is not a type that has been configured for authentication and authorization, in step 308, the authentication and authorization logic passes the message to logic in the network infrastructure element 110A for further processing such as forwarding the message towards its intended destination. If the incoming message is a type of an application message that has been configured for authentication and authorization, in step 310, the credential extraction 206 determines whether user credential location definitions should be consulted. For a plurality of application message types, the user credentials may be located in standard locations. In step 314, the credential extraction 206 identifies the user credentials in those standard locations. For some application message types, on the other hand, the user credentials may be located in a proprietary locations or non-standard locations. In step 312, a user credential location is selected for definitions corresponding to one such application message type as appropriate and, in step 314, the user credentials in those locations are identified.

If step 316 determines that the identification of user credential has failed, then error handling is invoked at step 318. The error handling may include logging the error and suppressing the erroneous message from being further forwarded to its intended destination. If the identification of use credential is successful as determined at step 316, then the credential validation 208 is invoked, and at step 320, the process determines whether a built-in or extension authentication method is associated with the message type. If the incoming message is of a type that associates with an extension authentication method, then at step 322, processing is passed to the extension validator 218, which handles invocation of the extension authentication method provided by extension authentication 224 in extension package 220, and which passes all the parameters necessary or optional for the invocation of the extension authentication method. If the incoming message is of a type that associates with a built-in authentication method, at step 324, then processing is passed to the validator 212 for executing the specified built-in authentication method.

At step 326, the credential validation 208 determines the result of the authentication method, whether it is built-in or extension. If the authentication method has failed to authenticate the identity, processing is passed to step 318 for error handling. If the user identity associated with user credentials has been successfully authenticated, then credential authorization 210 is invoked, and at step 330 determines whether an authorization method has been specified for the message type. If not, the authentication and authorization logic passes the message at step 308 to logic in the network infrastructure element 110A for further processing such as forwarding the message towards its intended destination.

If the incoming message is of a type that associates with an extension authorization method, at step 334, processing is passed to the extension authorizer 216, which handles invocation of the extension authorization method provided by extension authorization 226 in extension package 220, and which passes all the parameters necessary or optional for the invocation of the extension authorization method. If the incoming message is of a type that associates with a built-in authorization method, at step 336, processing is passed to the authorizer 214 for executing the specified built-in authorization method.

At step 338, the credential authorization 210 determines the result of the authorization method, whether it is built-in or extension. If the authorization has failed to authorize privileges required for the application message type for the identity for whatever reason, processing is passed to step 318 for error handling. Else if the user identity associated with user credentials has been successfully authorized for the privileges required for the application message type, the authentication and authorization logic passes the message at step 308 to a logic in the network infrastructure element 110A for further processing such as forwarding the message towards its intended destination.

3.0 Aons Implementation Examples 3.1 Aons General Overview

In an embodiment, AONS comprises a set of software modules hosted on a network infrastructure element, such as a router or switch, that can identify application messages from packet flows, perform operations on the applications messages, and perform application functions on behalf of applications, clients and servers. Examples of operations and functions include format transformation; payload changes based on policy; performing load-balancing decisions; sending messages to monitoring stations; and creating log entries, notifications and alerts according to rules. AONS complements existing networking technologies by providing a greater degree of awareness of what information is flowing within the network and helping users to integrate disparate applications by routing information to the appropriate destination, in the format expected by that destination; enforce policies for information access and exchange; optimize the flow of application traffic, both in terms of network bandwidth and processing overheads; provide increased manageability of information flow, including monitoring and metering of information flow for both business and infrastructure purposes; and provide enhanced business continuity by transparently backing up or re-routing critical business data.

AONS integrates with network-layer support to provide a more holistic approach to information flow and management, mapping required features at the application layer into low-level networking features implemented by routers, switches, firewalls and other networking systems. In an embodiment, a data processing unit ("blade") in a router or switch hosts and executes one or more AONS software modules ("bladelets") to implement the functions herein.

3.2 Multi-Blade Architecture

According to one embodiment, an AONS blade in a router or a switch performs the actions discussed herein.

Figure 4:
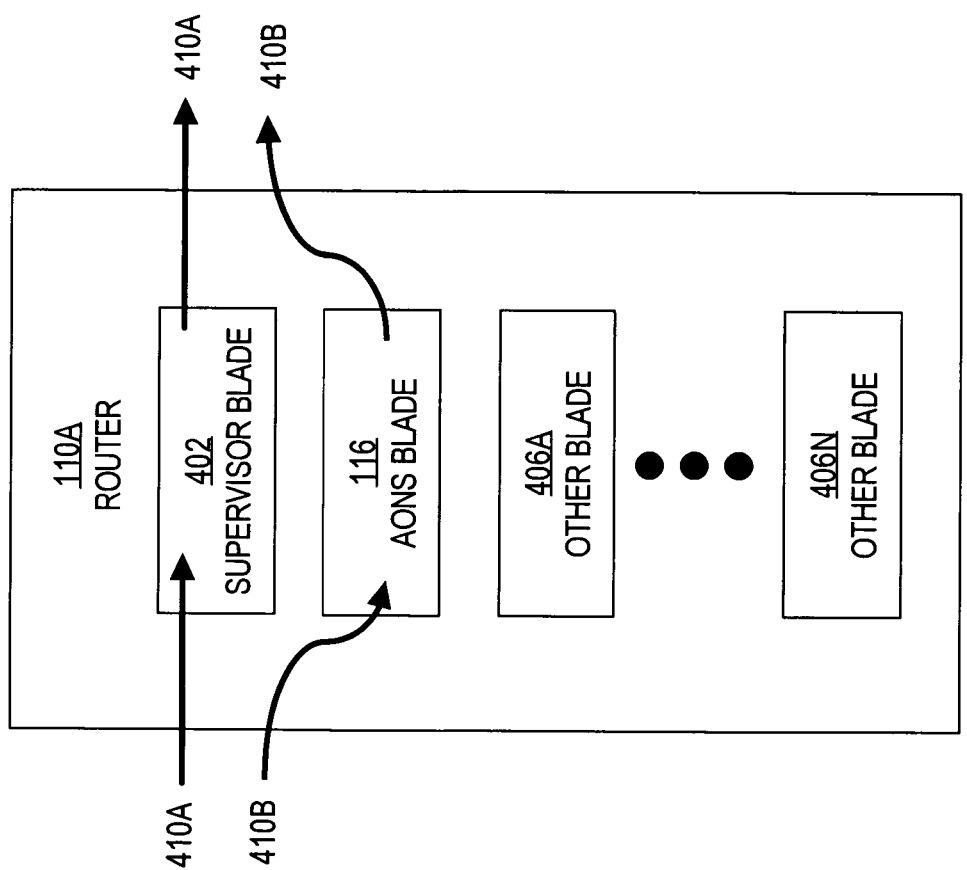
FIG. 4 is a block diagram that illustrates one embodiment of a router in which a supervisor blade directs some packet flows to an AONS blade and/or other blades.

FIG. 4 is a block diagram that illustrates one embodiment of a router 110A in which a supervisor blade 402 directs some of packet flows 410A-B to an AONS blade and/or other blades 406A-N. Router 110A comprises supervisor blade 402, AONS blade 116, and other blades 406A-N. Each of blades 402, 116, and 406A-N is a single circuit board populated with components such as processors, memory, and network connections that are usually found on multiple boards. Blades 402, 116, and 406A-N are designed to be addable to and removable from router 110A. The functionality of router 110A is determined by the functionality of the blades therein. Adding blades to router 110A can augment the functionality of router 110A, but router 110A can provide a lesser degree of functionality with fewer blades at a lesser cost if desired. One or more of the blades may be optional.

Router 110A receives packet flows such as packet flows 410A-B. More specifically, packet flows 410A-B received by router 110A are received by supervisor blade 402. Supervisor blade 402 may comprise a forwarding engine and/or a route processor such as those commercially available from Cisco Systems, Inc.

In one embodiment, supervisor blade 402 classifies packet flows 410A-B based on one or more parameters contained in the packets of those packet flows. If the parameters match specified parameters, then supervisor blade 402 sends the packets to a specified one of AONS blade 116 and/or other blades 406A-N. Alternatively, if the parameters do not match any specified parameters, then supervisor blade 402 performs routing functions relative to the particular packet and forwards the particular packet on toward the particular packet's destination.

For example, supervisor blade 402 may determine that packets in packet flow 410B match specified parameters. Consequently, supervisor blade 402 may send packets in packet flow 410B to AONS blade 116. Supervisor blade 402 may receive packets back from AONS blade 116 and/or other blades 406A-N and send the packets on to the next hop in a network path that leads to those packets' destination. For another example, supervisor blade 402 may determine that packets in packet flow 410A do not match any specified parameters. Consequently, without sending any packets in packet flow 410A to AONS blade 116 or other blades 406A-N, supervisor blade 402 may send packets in packet flow 410A on to the next hop in a network path that leads to those packets' destination.

AONS blade 116 and other blades 406A-N receive packets from supervisor blade 402, perform operations relative to the packets, and return the packets to supervisor blade 402. Supervisor blade 402 may send packets to and receive packets from multiple blades before sending those packets out of router 110A. For example, supervisor blade 402 may send a particular group of packets to other blade 406A. Other blade 406A may perform firewall functions relative to the packets and send the packets back to supervisor blade 402. Supervisor blade 402 may receive the packet from other blade 406A and send the packets to AONS blade 116. AONS blade 116 may perform one or more message payload-based operations relative to the packets and send the packets back to supervisor blade 402.

3.3 Aons Blade Message Processing Framework

Figure 5:
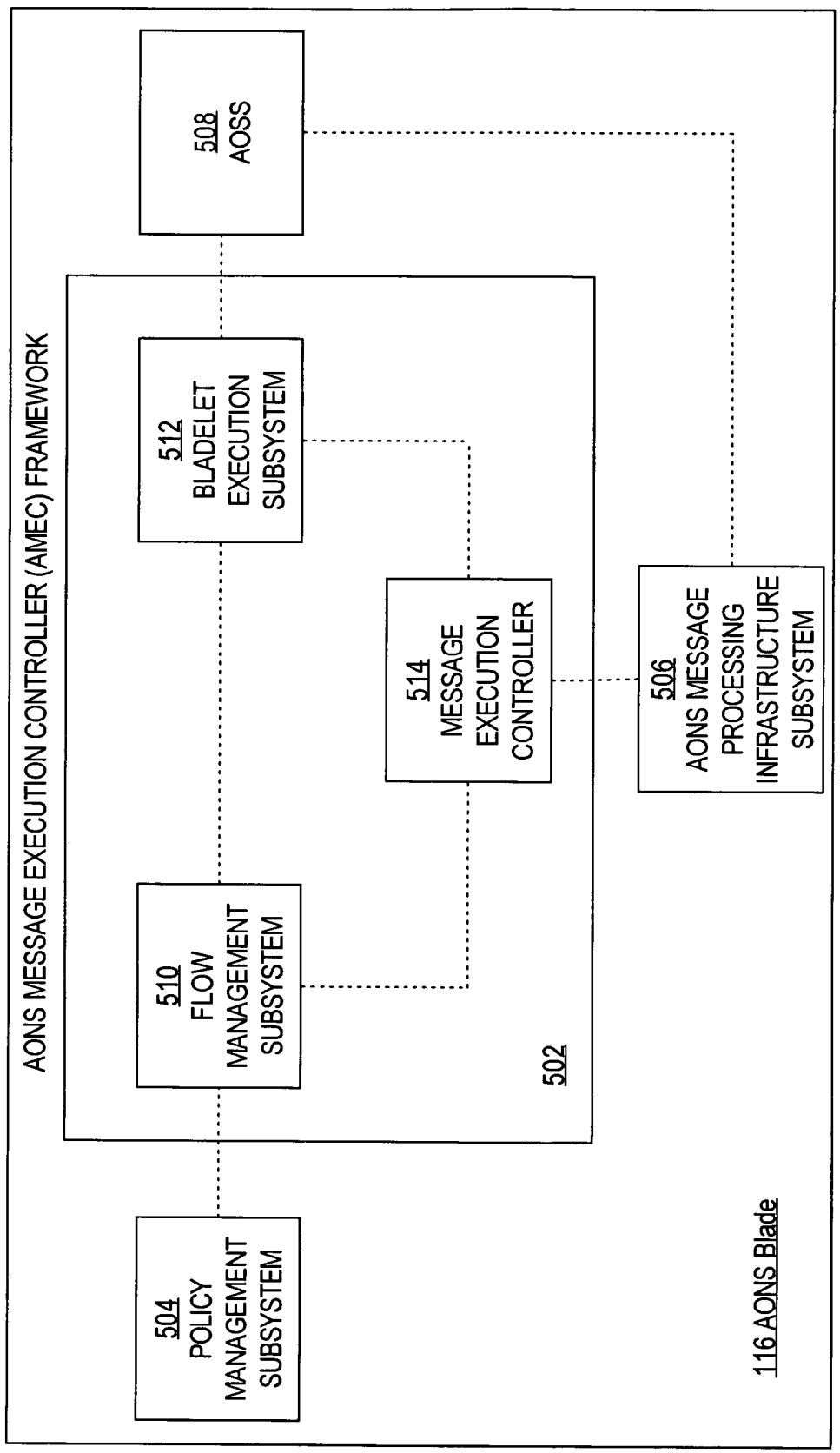
FIG. 5 is a diagram that illustrates message-processing modules within an AONS node.

FIG. 5 is a diagram that illustrates message-processing modules within an AONS blade 116. AONS blade 116 comprises an AONS message execution controller (AMEC) framework 502, a policy management subsystem 504, an AONS message processing infrastructure subsystem 506, and an AOSS 508. AMEC framework 502 comprises a flow management subsystem 510, a bladelet execution subsystem 512, and a message execution controller 514. Policy management subsystem 504 communicates with flow management subsystem 510. AOSS 508 communicates with bladelet execution subsystem 512 and AONS message processing infrastructure subsystem 506. AONS message processing infrastructure subsystem 506 communicates with message execution controller 514. Flow management subsystem 510, bladelet execution subsystem, and message execution controller 514 all communicate with each other.

Figure 6:
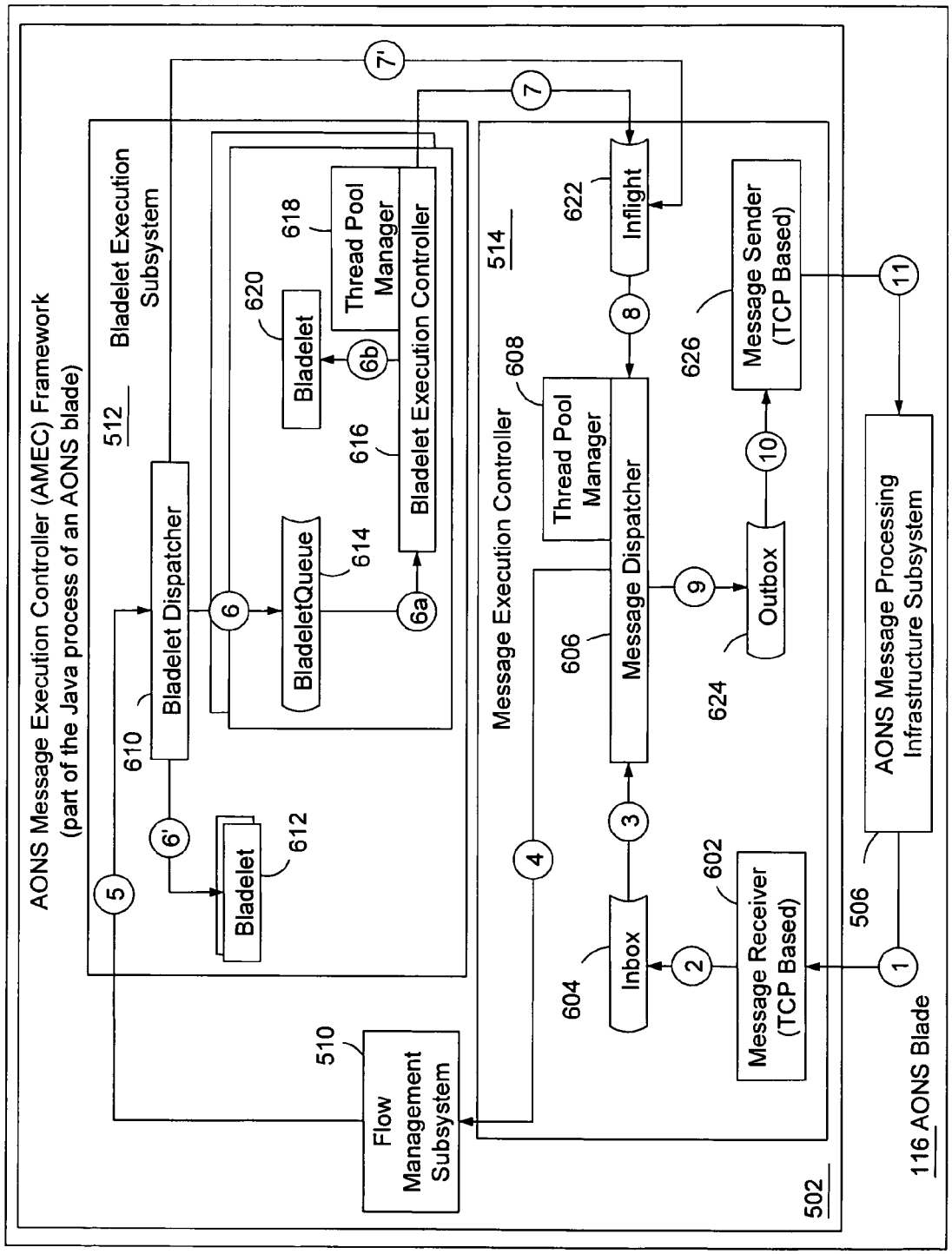
FIG. 6 is a diagram that illustrates message processing within AONS node.

FIG. 6 is a diagram that illustrates message processing within AONS blade 116. AMEC framework 602 is an event-based multi-threaded mechanism to maximize throughput while minimizing latency for messages in the AONS blade. According to one embodiment, received packets are re-directed, TCP termination is performed, SSL termination is performed if needed, Layer 5 protocol adapter and access method processing is performed (using access methods such as HTTP, SMTP, FTP, JMS/MQ, JMS/RV, JDBC, etc.), AONS messages (normalized message format for internal AONS processing) are formed, messages are queued, messages are dequeued based on processing thread availability, a flow (or rule) is selected, the selected flow is executed, the message is forwarded to the message's destination, and for request/response-based semantics, responses are handled via connection/session state maintained within AMEC framework 602.

In one embodiment, executing the flow comprises executing each step (i.e., bladelet/action) of the flow. If a bladelet is to be run within a separate context, then AMEC framework 602 may enqueue into bladelet-specific queues, and, based on thread availability, dequeue appropriate bladelet states from each bladelet queue.

3.4 Extension Package Implementation

Conventional network elements are primarily static, and any configuration or change is done via policies. Any changes in an operating system or applications running on the network element are performed in a controlled manner using standard upgrade approaches. According to an embodiment, using a true extensibility framework, a network element can allow customers and partners to dynamically change the runtime behavior of application message processing rules by allowing the user to write code in any language, deploy it a hot manner and update the runtime to load this new code—all during normal processing of the network element.

In an embodiment, custom bladelets allow for software code to be modified and loaded by customers dynamically into network elements for changing the processing logic applied on messages as they flow through the network. Custom protocol adapters allow for software code to modified and loaded by customers dynamically into network elements for changing which protocols are understood and managed in intermediate network nodes.

Today network elements generally do not have or have limited support for extensibility where customers can define their own software programs and upload into the network element. However, an Application Oriented Network (AON) as disclosed herein provides an environment in which customers can create programs that can be dynamically loaded and executed on the network device. In order to ensure that such dynamically loaded code is well behaved and do not accidentally or deliberately hamper the functioning of the network device, a sandboxed environment may be provided that protects the network element from such harm.

Currently network elements do not allow custom code to be uploaded onto the device to provide a programmable environment. If custom code is required to be installed on the device, typically a new operating system image containing the new functionality is created. The access control and security of such code is controlled largely at build time or by providing options to control behavior of the module via a command line interface. Hence the problem of code behavior is addressed in a static manner and does not change dynamically other than in a predictable manner by defining how the behavior can be controlled.

The problem of runtime program behavior is currently only addressed in a static manner. This was adequate because network devices do not allow custom code to be dynamically uploaded into a device without altering the running image. The method and apparatus presented herein solves the problem of securing and controlling the behavior of such dynamically uploaded code in a network device (a feature introduced by AON and covered in another patent application) by:

1. Providing a mechanism to specify permissions on the executing code that cannot be overridden and controlled by the network device itself. Permissions can be specified that either allow or deny access to resources;

2. Providing a mechanism to specify permissions that a user can override and can control whether or not particular operations are allowed. Permissions can be specified that either allow or deny access to resources;

3. Providing a mechanism to customize permissions so that the user or administrator can determine which permissions to override. Permissions can be specified that either allow or deny access to resources;

4. Provide an inheritance scheme that allows these permissions to be extended or inherited by custom code extensions.

At runtime, the network element verifies the permissions associated with the resource before permitting or denying execution.

This method and apparatus allows a network administrator or user to provision custom programs into the network device and provides a secure sandboxed environment in which they can execute without harming the network device. Unlike prior approaches, the approach herein:

1. Provides a secure environment in which custom programs that are deployed in a network device can execute.

2. Provides a data driven approach to easily customize and extend the security capabilities of the device.

3. Provides a language independent mechanism to express security permissions so that the security can be leveraged regardless of the implementing language.

4. Provides a secure container in which custom code executes regardless of the implementing language.

In one embodiment, the following tools are provided for creating extension package in an AONS node: a custom bladelet software development kit (hereinafter "Custom Bladelet SDK"), a design studio, or ADS, and an admin tool, or AMC, all commercially available from Cisco Systems, Inc. A designer uses Cisco Custom Bladelet SDK, java editor, or other third party tools to write Java code that will provide bladelet functionality. ADS is a visual tool for designing flows and applying message classification and mapping policies. AMC is a web-based interface to perform all administration and configuration functions.

Figure 7:
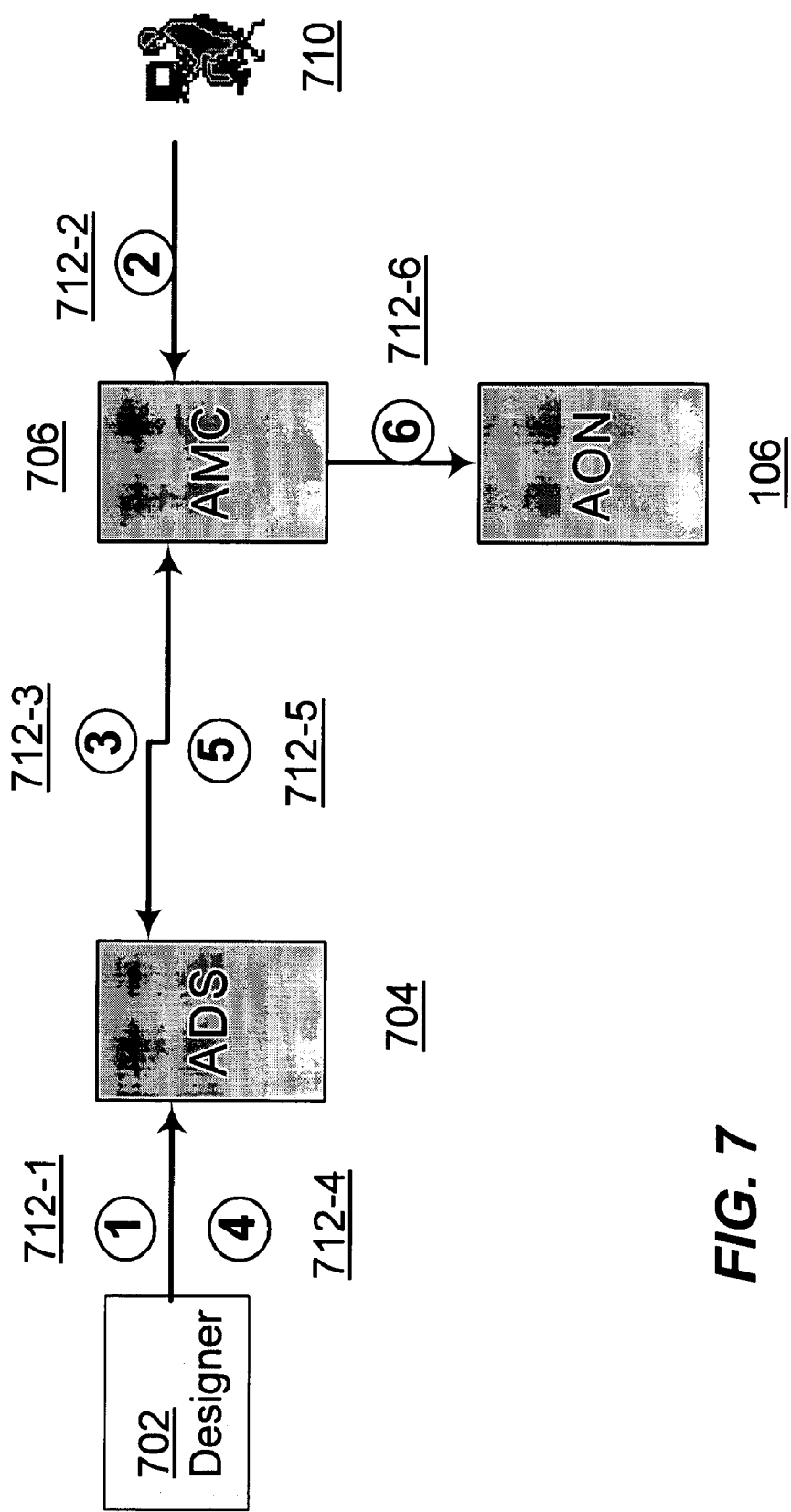
FIG. 7 is a flow diagram of how an authentication and/or authentication package is created and provisioned to an AONS blade, in one embodiment.

FIG. 7 is a flow diagram of how an extension package is created and provisioned to an AONS blade, in one embodiment. In one embodiment, designer 702 develops new custom bladelet classes to support an extension function by extending bladelet classes provided in Cisco Custom Bladelet SDK and implementing custom APIs to perform desired functions. Table 1 identifies example JAVA classes and methods that can be used in an implementation.

TABLE 1

CUSTOM BLADELET API
AbstractCustomBladelet
This interface defines an abstract custom bladelet class. Developers intending to provide a custom bladelet function extend this class by implementing the abstract methods and overriding any of the public or protected methods in this class.

| Method | Description | Return Type |
|---|---|---|
| getLogger | Returns a handle to the logging object that the custom bladelet implementor can use to log messages | Log |
| getLogger | Returns a handle to the logging object that the custom bladelet implementor can use to log messages | Log |
| setLogger(Log logger) | Uses the input logger as the logger object for this custom bladelet | NONE |
| OnCreate( ) | Called by the loader just before an instance of this bladelet is created. Optional method - default implementation does nothing. | NONE |
| OnLoad | Called by the loader just before this class is loaded into the virtual machine. | NONE |

TABLE 1-continued

CUSTOM BLADELET API
AbstractCustomBladelet
This interface defines an abstract custom bladelet class. Developers intending to provide a custom bladelet function extend this class by implementing the abstract methods and overriding any of the public or protected methods in this class.

| Method | Description | Return Type |
|---|---|---|
| OnDestroy | Optional method - default implementation does nothing. Called by the loader just before the instance of this bladelet is garbage collected. Optional method - default implementation does nothing. | NONE |
| OnException | Called by the loader when an instance of the bladelet throws an exception that is not caught. | NONE |
| OnUnload( ) | Called by the loader just before the class object is unloaded from the VM. Optional method - default implementation does nothing. | NONE |

At step 712-1, the designer 702 interacts with ADS 704 and creates a custom bladelet or adapter extension package. As a part of creating the package, the designer 702 provides a number of artifacts. First, the designer 702 provides one or more JAVA *.jar files implementing an extended authentication method and necessary libraries. For example, in case of a custom bladelet extension, the designer 702 provides the jar files which contain the class that extend the AbstractCustomBladelet class and any other supporting class files that are needed to execute the business logic implemented by the custom bladelet.

Additionally, the designer 702 provides bladelet extension info XML files for the custom bladelets, using bladelet extension info schema defined in Cisco Custom Bladelet SDK. Table 2 shows an example bladelet extension info XML file that can be used in an implementation.

TABLE 2

EXAMPLE BLADELET EXTENSION INFO XML FILE

```
<bladelet-info>
<!--
  Manage Aggregates
-->
<bladelet name="ManageAggregates" displayNameKey="ManageAggregates.name"
    versionId="1" bladeletClass="com.cisco.aons.visibility.ManageAggregatesBladelet"
    categoryKey="general.category.key" bundle="com.cisco.aons.visibility.visibility"
    validatorClass="com.cisco.aons.visibility.StatisticsBladeletValidator" validatorRules="">
<icon-ref>
<palette-icon href="com/cisco/aons/visibility/26i_dataaggregatorsetup.png" />
<document-icon href="com/cisco/aons/visibility/i_dataaggregatorsetup.png" />
</icon-ref>
<bladelet-design>
<bladelet-parameters>
<configuration-group name="Statistics" key="manage.aggregates.configuration.group"
    valueKey="manage.aggregates.configuration.group.create" value="create" type="radio">
<configuration-subgroup name="manage-aggregates-create-basic"
    key="manage.aggregates.configuration.group.create.csg.basic">
<parameter name="id" designName="createId" type="string" optional="false"
    allowVarBinding="false" tooltipKey="id.param.tooltipkey" key="id.param.key" />
<parameter name="definition" designName="createDefinition" allowVarBinding="false"
    key="definition.param.key" tooltipKey="createDefinition.param.tooltipKey"
    optional="false" type="list">
<column-info name="column" allowVarBinding="false" allowUserInput="true" type="string"
    key="column.param.key" tooltipKey="create.column.param.tooltipKey" />
<column-info name="type" allowVarBinding="false" allowUserInput="true" type="string"
    key="type.param.key" tooltipKey="create.type.param.tooltipKey" />
</parameter>
```

TABLE 2-continued

EXAMPLE BLADELET EXTENSION INFO XML FILE

```
    </configuration-subgroup>
  <configuration-subgroup name="manage-aggregates-create-advanced"
      key="manage.aggregates.configuration.group.create.csg.advanced">
    <parameter name="maxWindow" designName="manage-aggregates-create-advanced-
      maxWindow"
      key="manage.aggregates.configuration.group.create.csg.advanced.maxWindow"
      type="string" optional="true" editor="textbox"
      tooltipKey="manage.aggregates.configuration.group.create.csg.advanced.maxWindow.display
      " />
  </configuration-subgroup>
  </configuration-group>
  <configuration-group name="Statistics" key="manage.aggregates.configuration.group"
      valueKey="manage.aggregates.configuration.group.delete" value="delete" type="radio">
  <configuration-subgroup>
    <parameter name="id" designName="deleteId" type="string" optional="false"
      allowVarBinding="false" tooltipKey="idDelete.param.tooltipkey" key="id.param.key" />
    </configuration-subgroup>
    </configuration-group>
  <configuration-group name="Statistics" key="manage.aggregates.configuration.group"
      valueKey="manage.aggregates.configuration.group.clear" value="clear" type="radio">
  <configuration-subgroup>
    <parameter name="id" designName="clearId" type="string" optional="false"
      allowVarBinding="false" tooltipKey="idClear.param.tooltipkey" key="id.param.key" />
    </configuration-subgroup>
    </configuration-group>
    </bladelet-parameters>
    </bladelet-design>
  <bladelet-deployment>
    <system-params />
      </bladelet-deployment>
    <bladelet-runtime />
      </bladelet>
    <!--
    End Manage Aggregates
    -->
  <!--
  Compute Aggregates
  -->
  <bladelet name="ComputeAggregates" displayNameKey="ComputeAggregates.name"
      versionId="1" bladeletClass="com.cisco.aons.visibility.ComputeAggregatesBladelet"
      categoryKey="general.category.key" bundle="com.cisco.aons.visibility.visibility"
      validatorClass="com.cisco.aons.visibility.StatisticsBladeletValidator" validatorRules="">
  <icon-ref>
    <palette-icon href="com/cisco/aons/visibility/26i_dataaggregator.png" />
    <document-icon href="com/cisco/aons/visibility/i_dataaggregator.png" />
      </icon-ref>
    <exceptions>
    <exception id="Missing-Aggregate-Exception" key="exception.missing.aggregate.label"
      desc="Aggregate not defined" descKey="exception.missing.aggregate.desc" />
      </exceptions>
  <bladelet-design>
  <bladelet-parameters>
  <configuration-group name="Statistics" key="compute.aggregates.configuration.group"
      valueKey="compute.aggregates.configuration.group.update" value="update" type="radio">
  <configuration-subgroup>
    <parameter name="id" designName="updateId" type="string" optional="false"
      allowVarBinding="false" tooltipKey="idUpdate.param.tooltipkey" key="id.param.key" />
    <parameter name="data" designName="updateDefinition" allowVarBinding="false"
      key="definition.update.param.key" tooltipKey="updateDefinition.param.tooltipKey"
      optional="false" type="list">
    <column-info name="column" allowVarBinding="false" allowUserInput="true" type="string"
      key="column.param.key" tooltipKey="update.column.param.tooltipKey" />
    <column-info name="value" allowVarBinding="true" allowUserInput="true" type="object"
      key="value.param.key" tooltipKey="update.value.param.tooltipKey" />
      </parameter>
    </configuration-subgroup>
    </configuration-group>
  <configuration-group name="Statistics" key="compute.aggregates.configuration.group"
      valueKey="compute.aggregates.configuration.group.extract" value="compute"
      type="radio">
  <configuration-subgroup>
    <parameter name="query" cdataType="true" key="query.param.key" type="string"
      optional="false" editor="textarea" tooltipKey="query.param.tooltipKey" />
      <!--
      <parameter name="result" allowVarBinding="false" key="result.param.key"
      optional="false" type="list">
        <column-info name="value"
```

TABLE 2-continued

EXAMPLE BLADELET EXTENSION INFO XML FILE

```
            allowVarBinding="false"
            allowUserInput="true"
            type="string"
            key="result.value.param.key"
            tooltipKey="result.value.param.tooltipKey">
          </column-info>
        </parameter>
      -->
      </configuration-subgroup>
    </configuration-group>
  <configuration-group name="Statistics" key="compute.aggregates.configuration.group"
      valueKey="compute.aggregates.configuration.group.report" value="report" type="radio">
  <configuration-subgroup>
  <parameter-group name="CounterInput"
      key="compute.aggregates.configuration.group.key.report.pg.ree">
    <parameter name="reportQuery" cdataType="true" type="string" optional="false"
        editor="textarea" key="reportQuery.param.key"
        tooltipKey="reportQuery.param.tooltipKey" />
    </parameter-group>
    <parameter name="reportResult" optional="false" allowVarBinding="false"
        allowUserInput="true" type="string" key="reportResult.param.key"
        tooltipKey="reportResult.param.tooltipKey" />
      </configuration-subgroup>
    </configuration-group>
  </bladelet-parameters>
  </bladelet-design>
  <bladelet-deployment>
  <system-params />
  </bladelet-deployment>
  <bladelet-runtime />
  </bladelet>
  - <!--
  End Compute Aggregates
  -->
  <bladelet name="Compute" displayNameKey="Compute.name" versionId="1"
      bladeletClass="com.cisco.aons.visibility.ComputeBladelet"
      categoryKey="general.category.key" bundle="com.cisco.aons.visibility.visibility"
      validatorClass="com.cisco.aons.visibility.ComputeBladeletValidator" validatorRules="">
  <icon-ref>
  <palette-icon href="com/cisco/aons/visibility/26i__computation.png" />
  <document-icon href="com/cisco/aons/visibility/i__computation.png" />
    </icon-ref>
  <exceptions>
    <exception id="Invalid-Operation-Exception" key="exception.invalid.operation.label"
        desc="An invalid operation has occurred." descKey="exception.invalid.operation.desc" />
    </exceptions>
  <bladelet-design>
  <bladelet-parameters>
  <configuration-group name="Compute" key="expression.configuration.group.key">
  <configuration-subgroup>
  <parameter name="expressions" allowVarBinding="false" key="expressions.param.key"
        tooltipKey="expressions.param.tooltipKey" optional="false" type="list">
    <column-info name="variable" allowVarBinding="false" allowUserInput="true" type="string"
        key="variable.param.key" tooltipKey="variable.param.tooltipKey" />
    <column-info name="expression" allowVarBinding="false" allowUserInput="true" type="string"
        key="expression.param.key" tooltipKey="expression.param.tooltipKey" />
    </parameter>
    </configuration-subgroup>
    </configuration-group>
  </bladelet-parameters>
  </bladelet-design>
  <bladelet-deployment>
  <system-params />
  </bladelet-deployment>
  <bladelet-runtime />
    </bladelet>
  <bladelet name="ContentBuilder" versionId="1"
      displayNameKey="contentbuilder.display.name.key" categoryKey="general.category.key"
      bladeletClass="com.cisco.aons.visibility.ContentBuilderBladelet"
      bundle="com.cisco.aons.visibility.visibility"
      validatorClass="com.cisco.aons.visibility.ContentBuilderBladeletValidator"
      validatorRules="">
  <icon-ref>
  <palette-icon href="com/cisco/aons/visibility/26i__dynamiccontent.png" />
  <document-icon href="com/cisco/aons/visibility/i__dynamiccontent.png" />
    </icon-ref>
  <bladelet-design>
```

TABLE 2-continued

EXAMPLE BLADELET EXTENSION INFO XML FILE

```
  <bladelet-parameters>
    <configuration-group name="ContentDefinition" key="content.defintion.group.key">
      <configuration-subgroup>
        <parameter name="template" allowVarBinding="false" optional="false"
            key="template.param.key" tooltipKey="template.param.tooltipKey" cdataType="true"
            type="string" editor="textarea" />
      </configuration-subgroup>
    </configuration-group>
  </bladelet-parameters>
  </bladelet-design>
  <bladelet-deployment />
  <bladelet-runtime>
    <exported-params>
      <param name="contents" scope="global" key="contents.export.key" type="string" />
    </exported-params>
  </bladelet-runtime>
  </bladelet>
</bladelet-info>
```

The designer 702 further provides the capability to define custom parameters for configuring this custom bladelet. The parameters may be defined by an attribute domain. Table 3 shows an example attribute domain for SiteMinder authentication that can be used in an implementation.

TABLE 3

EXAMPLE ATTRIBUTE DOMAIN

| No | Parameter/Property | Description |
|---|---|---|
| 1 | Access Server | Specifies IP Address of SiteMinder Policy Server. |
| 2 | Agent Name | Name of Web Agent configured in the Policy Server. |
| 3 | Agent Secret | Password or secret for the agent. This is needed to connect to the agent object in Policy Server. |
| 4 | Minimum no of connection | Agent API object is initialized with minimum no of connections. It creates these connections to SM Policy Server when it is initialized. |
| 5 | Maximum no of connection | Indicates the maximum no of connections Agent API will create. |
| 6 | Connection Step | Indicates the number by which connections are increased if Agent API needs to increase number of connections to SM Policy Server. Total number of connections does not exceed the value specified in 5. |
| 7 | Connection Timeout in seconds | This value is used as a timeout when any authentication or authorization call is made on Agent API object. |
| 8 | Authentication Port | Indicates the value of authentication port configured on SM Policy Server. SM 5.5 Policy Server can configure a specific port value to use for authentication service. For SM 6.0 default can be used. |
| 9 | Authorization Port | Indicates the value of authorization port configured on SM Policy Server. SM 5.5 Policy Server can configure a specific port value to use for authorization service. For SM 6.0 default can be used. |
| 10 | Accounting Port | Indicates the value of accounting port configured on SM Policy Server. SM 5.5 Policy Server can configure a specific port value to use for accounting service. For SM 6.0 default can be used. |
| 11 | Failover SM Policy Server Address | Specifies IP Address of Failover SM Policy Server to use. |

Note:
Properties in rows 4, 5, 6, 7, 8, 9, 10 are provided for Failover SM Policy Server also.

In one embodiment, the custom extension (bladelet or adapter) package created with the above artifacts is saved as a bar file on a disk.

At step 712-2, an administrator 710 uploads and registers the extension package to AMC 706. Once loaded and registered, the extension package is available for use in ADS.

At step 712-3, the designer 702 causes ADS 704 to synchronize with AMC 706 to retrieve the extension package which has been enabled and made available by the AMC uploading and registering step 712-2.

At step 712-4, the designer 702 continues his or her designing tasks of defining message flows between bladelets, message types.

At step 712-5, the administrator 710 causes AMC 706 to synchronize with ADS 704 to retrieve the flows, message types, user credential location definitions, and associations defined in step 712-4.

At step 712-6, the administrator 710 deploys to an AON blade 106 the extension package, and a policy. In one embodiment, the policy comprises an identification of the message flows, message types, user credential location definitions and associations of the user credential location definitions with the message types, and enable the AON blade 106 to use the authentication/authorization method available in the extension package. In other embodiments, the policy may specify other custom or user-defined methods that perform any other desired functions.

Thus, in the approach herein, custom or user-defined application program extensions may be loaded into a network infrastructure element such as a router or switch without restarting the device. At a high level, the approach herein provides program extensibility logic operable for receiving one or more user program extensions that comprise logic operable to interface with the application program and perform message processing functions or protocol processing functions that are not in the application program; installing the one or more user program extensions without restarting the apparatus; receiving one or more packets representing an application message; selecting a particular one of the user program extensions based on a protocol associated with the message; loading the particular one of the user program extensions; executing business logic of the application program associated with the received message; and invoking a function of the particular one of the user program extensions in response to a call in the business logic.

In an embodiment, the application message comprises one or more transport protocol headers, and the program extensibility logic is operable to select and invoke the particular one of the user program extensions based on values located in the one or more transport protocol headers. In an embodiment, the application message comprises application message headers, and the program extensibility logic is operable to select and invoke the particular one of the user program extensions based on values located in the application message headers.

In an embodiment, the user program extensions comprise extension functions, and the program extensibility logic is operable to select and invoke a particular extension function from among the plurality of extension functions based upon values in the application message.

In an embodiment, the user program extensions comprise protocol handling functions, and the program extensibility logic is operable to select and invoke one of the protocol handling functions from among the plurality of protocol handling functions based upon values in the application message.

In an embodiment, the program extensibility logic is operable to: identify in the application message any of a transport protocol and an application protocol; select a particular user-defined custom protocol handler, from among a plurality of stored user-defined protocol handlers, based upon the identified transport protocol; use the particular user-defined custom protocol handler to transform the application message into a modified outbound application message.

In an embodiment, the program extensibility logic is operable to: identify a custom user function based on values in any of the transport protocol of the message, application protocol of the message, and message body; load and invoke the user defined extension function based on the identified custom user function.

4.0 Implementation Mechanisms—Hardware Overview

Figure 8:
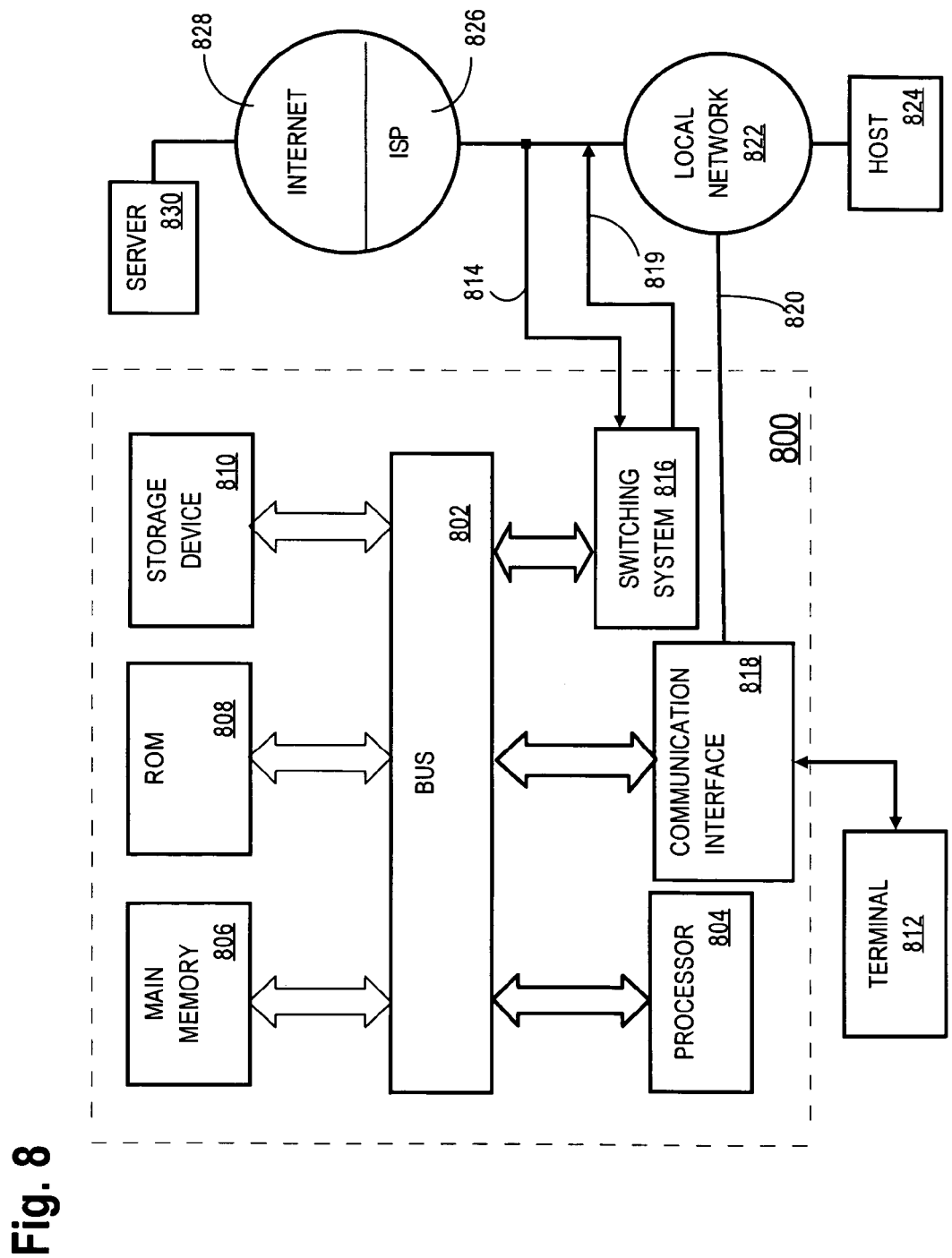
FIG. 8 is a block diagram that illustrates a computer system upon which an embodiment may be implemented.

FIG. 8 is a block diagram that illustrates a computer system 800 upon which an embodiment of the invention may be implemented. The preferred embodiment is implemented using one or more computer programs running on a network element such as a router device. Thus, in this embodiment, the computer system 800 is a router.

Computer system 800 includes a bus 802 or other communication mechanism for communicating information, and a processor 804 coupled with bus 802 for processing information. Computer system 800 also includes a main memory 806, such as a random access memory (RAM), flash memory, or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk, flash memory or optical disk, is provided and coupled to bus 802 for storing information and instructions.

A communication interface 818 may be coupled to bus 802 for communicating information and command selections to processor 804. Interface 818 is a conventional serial interface such as an RS-232 or RS-422 interface. An external terminal 812 or other computer system connects to the computer system 800 and provides commands to it using the interface 814. Firmware or software running in the computer system 800 provides a terminal interface or character-based command interface so that external commands can be given to the computer system.

A switching system 816 is coupled to bus 802 and has an input interface 814 and an output interface 819 to one or more external network elements. The external network elements may include a local network 822 coupled to one or more hosts 824, or a global network such as Internet 828 having one or more servers 830. The switching system 816 switches information traffic arriving on input interface 814 to output interface 819 according to pre-determined protocols and conventions that are well known. For example, switching system 816, in cooperation with processor 804, can determine a destination of a packet of data arriving on input interface 814 and send it to the correct destination using output interface 819. The destinations may include host 824, server 830, other end stations, or other routing and switching devices in local network 822 or Internet 828.

The invention is related to the use of computer system 800 for extensible authentication and authorization in a network infrastructure element. According to one embodiment of the invention, extensible authentication and authorization in a network infrastructure element is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, and volatile media. Non-volatile media includes, for example, optical or magnetic disks, such as storage device 810. Volatile media includes dynamic memory, such as main memory 806.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Communication interface 818 also provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for extensible authentication and authorization in a network infrastructure element as described herein.

The received code may be executed by processor 804 as it is received, and/or stored in storage device 810, or other non-volatile storage for later execution.

5.0 Extensions And Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The preceding description has disclosed an approach for performing extensible authentication and authorization in a network device. The approach herein provides an improved authentication and authorization approach because a network device is more efficient in performing extended authentication or authorization methods, which may be deployed even after the network device has been installed.

The approach herein has numerous benefits over prior approaches. For example, the approach reduces the number of processing locations at which a message is authenticated or authorized. Application endpoints are not required to perform authentication or authorization. As a result, application resources can focus on core application functions, rather than implementing authentication and authorization logic in a fragmented manner.

The approach herein is useful for any network gear vendor that needs mechanisms to provide authentication and authorization capability in a networking device to enable better security.

What is claimed is:

1. A data processing apparatus, comprising:
a plurality of network interfaces that are coupled to a data network for receiving one or more packets therefrom and sending one or more packets thereto;
one or more processors;
a switching system coupled to the one or more processors and packet forwarding logic, wherein the switching system and packet forwarding logic are configured to receive packets on a first network interface, determine a second network interface on which to send the packets, and to send the packets on the second network interface;
a non-transitory computer-readable volatile or non-volatile storage medium having an application program stored thereon;
program extensibility logic which when executed by the one or more processors is operable to cause:
receiving one or more user software application program extensions,
using the one or more user software application program extensions, changing a runtime behavior of the packet forwarding logic during a normal processing of the switching system,
wherein the user software application program extensions comprise logic operable to interface with the application program and perform any of message processing functions and protocol processing functions that are not in the application program, and which emit and consume messages exchanged at a Layer Five or higher of the Open Systems Interconnection (OSI) reference model;

installing the one or more user software application program extensions without restarting the apparatus;

receiving one or more packets representing an application message;

selecting a particular one of the user software application program extensions based on a protocol associated with the message;

loading the particular one of the user software application program extensions;

executing business logic of the application program associated with the received message;

invoking a function of the particular one of the user software application program extensions in response to a call in the business logic.

2. The apparatus of claim 1, wherein the application message comprises one or more transport protocol headers, and wherein the program extensibility logic comprises logic which when executed by the one or more processors is operable to select and invoke the particular one of the user program extensions based on values located in the one or more transport protocol headers.

3. The apparatus of claim 1, wherein the application message comprises one or more application message headers, and wherein the program extensibility logic comprises logic which when executed by the one or more processors is operable to select and invoke the particular one of the user program extensions based on values located in the application message headers.

4. The apparatus of claim 1, wherein the one or more user program extensions comprise one or more extension functions, wherein the program extensibility logic comprises logic which when executed by the one or more processors is operable to select and invoke a particular extension function from among the plurality of extension functions based upon values in the application message.

5. The apparatus of claim 1, wherein the one or more user program extensions comprise one or more protocol handling functions, wherein the program extensibility logic comprises logic which when executed by the one or more processors is operable to select and invoke one of the protocol handling functions from among the plurality of protocol handling functions based upon values in the application message.

6. The apparatus of claim 1, comprising any of a packet data router and a packet data switch in a packet-switched network.

7. The apparatus of claim 1, wherein the program extensibility logic comprises logic which when executed by the one or more processors is operable to:
identify in the application message any of a transport protocol and an application protocol;
select a particular user-defined custom protocol handler, from among a plurality of stored user-defined protocol handlers, based upon the identified transport protocol;
use the particular user-defined custom protocol handler to transform the application message into a modified outbound application message.

8. The apparatus of claim 1, wherein the program extensibility logic comprises logic which when executed by the one or more processors is operable to:
identify a custom user function based on values in any of the transport protocol of the message, application protocol of the message, and message body;
load and invoke the user defined extension function based on the identified custom user function.

9. A data processing apparatus, comprising:
a plurality of network interfaces that are coupled to a data network for receiving one or more packets therefrom and sending one or more packets thereto;
one or more processors;
a switching system coupled to the one or more processors and packet forwarding logic, wherein the switching system and packet forwarding logic are configured to receive packets on a first network interface, determine a second network interface on which to send the packets, and to send the packets on the second network interface;
a non-transitory computer-readable volatile or non-volatile storage medium storing one or more sequences of instructions, which when executed by the one or more processors, cause the one or more processors to perform:
receiving one or more user software application program extensions, using the one or more user software application program extensions, changing a a runtime behavior of the packet forwarding logic during a normal processing of the switching system,
wherein the user software application program extensions comprise logic operable to interface with the application program and perform any of message processing functions and protocol processing functions that are not in the application program;
installing the one or more user software application program extensions without restarting the apparatus;
receiving one or more packets representing an application message;
selecting a particular one of the user software application program extensions based on a protocol associated with the message;
loading the particular one of the user software application program extensions;
executing business logic of the application program associated with the received message;
means for invoking a function of the particular one of the user software application program extensions in response to a call in the business logic.

10. The apparatus of claim 9, wherein the application message comprises one or more transport protocol headers, wherein the computer-readable medium further stores instructions, which cause: selecting and invoking the particular one of the user program extensions based on values located in the one or more transport protocol headers.

11. The apparatus of claim 9, wherein the application message comprises one or more application message headers, wherein the computer-readable medium further stores instructions, which cause: selecting and invoking the particular one of the user program extensions based on values located in the application message headers.

12. The apparatus of claim 9, wherein the one or more user program extensions comprise one or more extension functions, wherein the computer-readable medium further stores instructions, which cause: selecting and invoking a particular extension function from among the plurality of extension functions based upon values in the application message.

13. The apparatus of claim 9, wherein the one or more user program extensions comprise one or more protocol handling functions, wherein the computer-readable medium further stores instructions, which cause: selecting and invoking one of the protocol handling functions from among the plurality of protocol handling functions based upon values in the application message.

14. The apparatus of claim 9, wherein the computer-readable medium further stores instructions, which cause:

identifying in the application message any of a transport protocol and an application protocol;

selecting a particular user-defined custom protocol handler, from among a plurality of stored user-defined protocol handlers, based upon the identified transport protocol;

using the particular user-defined custom protocol handler to transform the application message into a modified outbound application message.

15. The apparatus of claim 9, wherein the computer-readable medium further stores instructions, which cause:

identifying a custom user function based on values in any of the transport protocol of the message, application protocol of the message, and message body;

loading and invoking the user defined extension function based on the identified custom user function.

16. The apparatus of claim 9, comprising any of a packet data router and a packet data switch in a packet-switched network.

17. A computer-implemented method, comprising:

receiving one or more user software application program extensions in a network infrastructure device that comprises an application program, using the one or more user software application program extensions, changing a runtime behavior of a packet forwarding logic during a normal processing of the network infrastructure device, wherein the user software application program extensions comprise logic operable to interface with the application program and perform any of message processing functions and protocol processing functions that are not in the application program;

installing the one or more user software application program extensions without restarting the device;

receiving one or more packets representing an application message;

selecting a particular one of the user software application program extensions based on a protocol associated with the message;

loading the particular one of the user software application program extensions;

executing business logic of the application program associated with the received message;

invoking a function of the particular one of the user software application program extensions in response to a call in the business logic.

18. The method of claim 17, wherein the application message comprises one or more transport protocol headers, and further comprising selecting and invoking the particular one of the user program extensions based on values located in the one or more transport protocol headers.

19. The method of claim 17, wherein the application message comprises one or more application message headers, and further comprising selecting and invoking the particular one of the user program extensions based on values located in the application message headers.

20. The method of claim 17, wherein the one or more user program extensions comprise one or more extension functions, and further comprising selecting and invoking a particular extension function from among the plurality of extension functions based upon values in the application message.

21. The method of claim 17, wherein the one or more user program extensions comprise one or more protocol handling functions, and further comprising selecting and invoking one of the protocol handling functions from among the plurality of protocol handling functions based upon values in the application message.

22. The method of claim 17, further comprising:

identifying in the application message any of a transport protocol and an application protocol;

selecting a particular user-defined custom protocol handler, from among a plurality of stored user-defined protocol handlers, based upon the identified transport protocol;

using the particular user-defined custom protocol handler to transform the application message into a modified outbound application message.

23. The method of claim 17, further comprising:

identifying a custom user function based on values in any of the transport protocol of the message, application protocol of the message, and message body;

loading and invoking the user defined extension function based on the identified custom user function.

24. A non-transitory computer-readable volatile or non-volatile storage medium encoded with program extensibility logic which when executed by one or more processors is operable to cause:

receiving one or more user software application program extensions, using the one or more user software application program extensions, changing a runtime behavior of a packet forwarding logic during a normal processing of the program extensibility logic of a network device, wherein the user software application program extensions comprise logic operable to interface with an application program of a computer system and perform any of message processing functions and protocol processing functions that are not in the application program;

installing the one or more user software application program extensions without restarting the computer system;

receiving one or more packets representing an application message;

selecting a particular one of the user software application program extensions based on a protocol associated with the message;

loading the particular one of the user software application program extensions;

executing business logic of the application program associated with the received message;

invoking a function of the particular one of the user software application program extensions in response to a call in the business logic.

* * * * *

UNITED STATES PATENT AND TRADEMARK OFFICE
CERTIFICATE OF CORRECTION

PATENT NO. : 7,840,700 B2
APPLICATION NO. : 11/473194
DATED : November 23, 2010
INVENTOR(S) : Kollivakkam Raghavan et al.

It is certified that error appears in the above-identified patent and that said Letters Patent is hereby corrected as shown below:

Claim 9, column 28, line 18   Please delete an "a" between changing and runtime

Claim 9, column 28, line 37   Please delete "means for"

Signed and Sealed this
Eighth Day of February, 2011

David J. Kappos
*Director of the United States Patent and Trademark Office*